US011087268B2

(12) United States Patent
Barbush et al.

(10) Patent No.: US 11,087,268 B2
(45) Date of Patent: Aug. 10, 2021

(54) SYSTEMS AND METHODS FOR DELIVERING AN ITEM TO A DYNAMIC LOCATION

(71) Applicant: UNITED PARCEL SERVICE OF AMERICA, INC., Atlanta, GA (US)

(72) Inventors: Anthony Barbush, Atlanta, GA (US); Kenneth Bradley Gubler, Marietta, GA (US); Robert J. Gillen, Alpharetta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 854 days.

(21) Appl. No.: 14/556,972

(22) Filed: Dec. 1, 2014

(65) Prior Publication Data

US 2015/0154559 A1 Jun. 4, 2015

Related U.S. Application Data

(60) Provisional application No. 61/910,852, filed on Dec. 2, 2013.

(51) Int. Cl.
 *G06Q 10/08* (2012.01)
 *G06Q 10/04* (2012.01)

(52) U.S. Cl.
 CPC ..... *G06Q 10/08355* (2013.01); *G06Q 10/047* (2013.01)

(58) Field of Classification Search
 CPC ......... G06Q 10/008355; G06Q 10/047; G06Q 10/08355; G06Q 10/0833; G06Q 10/0838
 See application file for complete search history.

(56) References Cited

U.S. PATENT DOCUMENTS 7,624,024 B2 11/2009 Levis et al.
8,015,023 B1 * 9/2011 Lee ................ G06Q 10/063114
 700/226

(Continued)

FOREIGN PATENT DOCUMENTS

GB 2450305 A 12/2008
IE 20080092 A1 9/2009

OTHER PUBLICATIONS

Greenwood et al., "Dynamic Dispatching and Transport Optimization—Real-World Experience with Perspectives on Pervasive Technology Integration", Jun. 20, 2009, IEEE Proceedings of the 42nd Hawaii International Conference on System Sciences, pp. 1-9 (Year: 2009).*

(Continued)

*Primary Examiner* — Rupangini Singh
(74) *Attorney, Agent, or Firm* — Shook, Hardy & Bacon L.L.P.

(57) ABSTRACT

Various embodiments of the present invention involve systems, methods, and computer program products utilized in facilitating alternative delivery options for customers. In certain embodiments, a consignee may meet a driver and receive an item at a location different from the delivery address associated with the item. The receipt of the item may be prior to the driver attempting to deliver the item to the designated shipping location or after an unsuccessful delivery attempt. The carrier, the driver, the carrier system, the mobile station, and/or the sensors located on the item may communicate with the consignee to arrange a mutually acceptable time and location to accomplish the delivery. In certain embodiments, the consignee may be responsible for arriving at a dynamic delivery location to retrieve the item while the driver is at the location performing other tasks.

25 Claims, 6 Drawing Sheets

(56) References Cited

U.S. PATENT DOCUMENTS

| | | | |
|---|---|---|---|
| 2003/0125963 A1 | 7/2003 | Haken | |
| 2004/0073490 A1 | 4/2004 | Shah et al. | |
| 2006/0235739 A1* | 10/2006 | Levis | G06Q 10/08 705/1.1 |
| 2009/0319078 A1 | 12/2009 | Jackson | |
| 2010/0182148 A1* | 7/2010 | Fan | G07C 9/00 340/572.1 |
| 2012/0030133 A1* | 2/2012 | Rademaker | G06Q 10/08 705/333 |
| 2012/0303543 A1* | 11/2012 | Marcus | G06Q 10/08 705/330 |
| 2013/0342343 A1* | 12/2013 | Harring | H04L 63/102 340/521 |
| 2014/0052661 A1* | 2/2014 | Shakes | G06Q 10/0836 705/339 |
| 2014/0330739 A1* | 11/2014 | Falcone | G06Q 10/08355 705/338 |
| 2014/0358703 A1* | 12/2014 | Stuntebeck | G06Q 10/083 705/15 |
| 2015/0081587 A1 | 3/2015 | Gillen | |
| 2015/0134557 A1* | 5/2015 | Cova | G06Q 10/087 705/333 |

OTHER PUBLICATIONS

Canadian Intellectual Property Office, Requisition by the Examiner for Application No. 2,931,816, Mar. 10, 2017, 6 pages, Canada.
Eurpean Patent Office, Extended European Search Report for Application No. 14827888.0, dated Mar. 27, 2017, 7 pages, Germany.
DPD Group, "Predict & Follow My Parcel", retrieved from <http://www.dpd.co.uk/content/products_services/predict_fmp.jsp> on Sep. 29, 2015, 3 pages.
Cartledge, James, "DPD UK Launching "Early Warning" System for Parcel Deliveries", *E-commerce*, Innovation, Mar. 3, 2014, 1 page, retrieved from <http://postandparcel.info/60288/news/innovation/dpd-uk-launching-early-warning-system-for-parcel-deliveries/print/> on Sep. 29, 2015.
DPD Group, "DPD Voted UK's Best Delivery Firm", Jan. 2013, 2 pages, Retrieved from <https://careers.dpd.co.uk/news/article.aspx?articleid=4> on Sep. 29, 2015.
International Searching Authority, International Search Report and Written Opinion for International Application No. PCT/US2014/68080, 8 pages, United States Patent and Trademark Office, U.S.A.
Office Action Received for Canadian Patent Application No. 2,931,816, dated Jan. 3, 2019, 8 pages.

* cited by examiner

SYSTEMS AND METHODS FOR DELIVERING AN ITEM TO A DYNAMIC LOCATION

CROSS-REFERENCE TO RELATED APPLICATIONS

The present application claims priority to and the benefit of U.S. Provisional Patent Application No. 61/910,852 filed on Dec. 2, 2013, which is incorporated herein by reference in its entirety.

BACKGROUND OF THE INVENTION

Shipping customers are often away from their preferred delivery address during normal business hours and therefore cannot receive items on their first delivery attempt. Thus, new concepts are needed to give customers additional flexibility in receiving an item.

BRIEF SUMMARY OF THE INVENTION

In general, embodiments of the present invention provide methods, apparatus, systems, computing devices, computing entities, and/or the like for facilitating alternative delivery options.

In one aspect, a method for delivering an item to a dynamic delivery location is provided. The method includes the steps of: receiving shipment data identifying a delivery address for the item; placing the item on a mobile asset based at least in part on a dispatch plan, wherein the dispatch plan identifies a plurality of stop locations; identifying a candidate dynamic delivery location by comparing the plurality of stop locations to a stop criteria wherein the candidate dynamic delivery location is different from the delivery address for the item; providing location information relative to the item to the consignee while the mobile asset is en route providing a service according the dispatch plan and prior to the item arriving at the candidate dynamic delivery location; verifying the consignee's identity; and providing the item to the consignee. In a further aspect, an apparatus including at least one processor and at least one memory including computer program code is provided. The at least one memory and the computer program code are configured to, with the processor, cause the apparatus to at least: receive shipment data identifying a delivery address for the item; assign the item to a mobile asset based at least in part on a dispatch plan, wherein the dispatch plan identifies a plurality of stop locations; identify a candidate dynamic delivery location by comparing the plurality of stop locations to a stop criteria wherein the candidate dynamic delivery location is different from the delivery address for the item; provide location information relative to the item to the consignee while the mobile asset is en route providing a service according the dispatch plan and prior to the item arriving at the candidate dynamic delivery location; verify the consignee's identity; and provide the item to the consignee.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
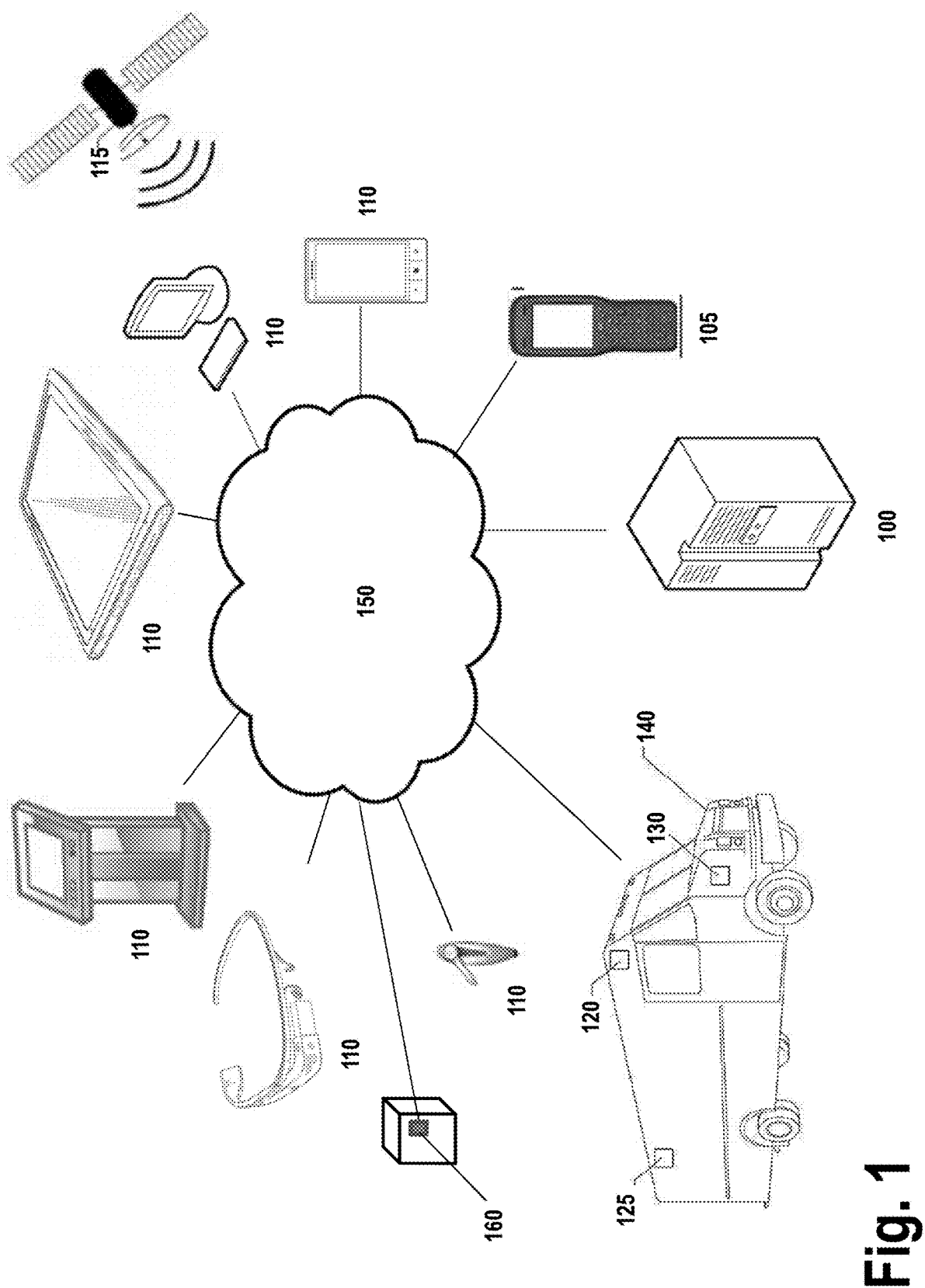
FIG. 1 is an overview of a system that can be used to practice embodiments of the present invention.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the present invention involve systems, methods, and computer program products utilized in facilitating alternative delivery options for customers. In certain embodiments, a consignee may meet a driver and receive an item at a location different from the delivery address associated with the item. The receipt of the item may be prior to the driver attempting to deliver the item to the designated shipping location or after an unsuccessful delivery attempt. The carrier (e.g., via a computing device, telephone, and the like), the driver (e.g., via a computing device, telephone, and the like), the carrier system, the mobile station, and/or the sensors located on the item may communicate with the consignee to arrange a mutually acceptable time and location (e.g., dynamic delivery location) to accomplish the delivery. In certain embodiments, the consignee may be responsible for arriving at a dynamic delivery location to retrieve the item while the driver is at the location performing other tasks (e.g., other pickups and/or deliveries). In certain embodiments the driver may verify the identity of the consignee when the item is retrieved. In the event the item is not delivered according to the alternative delivery option, the driver may attempt to deliver the item to the location associated with the item according to a predetermined delivery route.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations, respectively, may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of an exemplary embodiment of the present invention. As shown in FIG. 1, this particular embodiment may include one or more carrier systems 100, one or more mobile stations 105, one or more customer computing devices 110, one or more mobile assets 140 and one or more item computing devices and/or item sensors 160. Each of these components, entities, devices, systems, and similar words used herein interchangeably may be in direct or indirect communication with, for example, one another over the same or different wired or wireless networks 150. Additionally, while FIG. 1 illustrates the various system entities as separate, standalone entities, the various embodiments are not limited to this particular architecture.

1. Exemplary Carrier System

Figure 2:
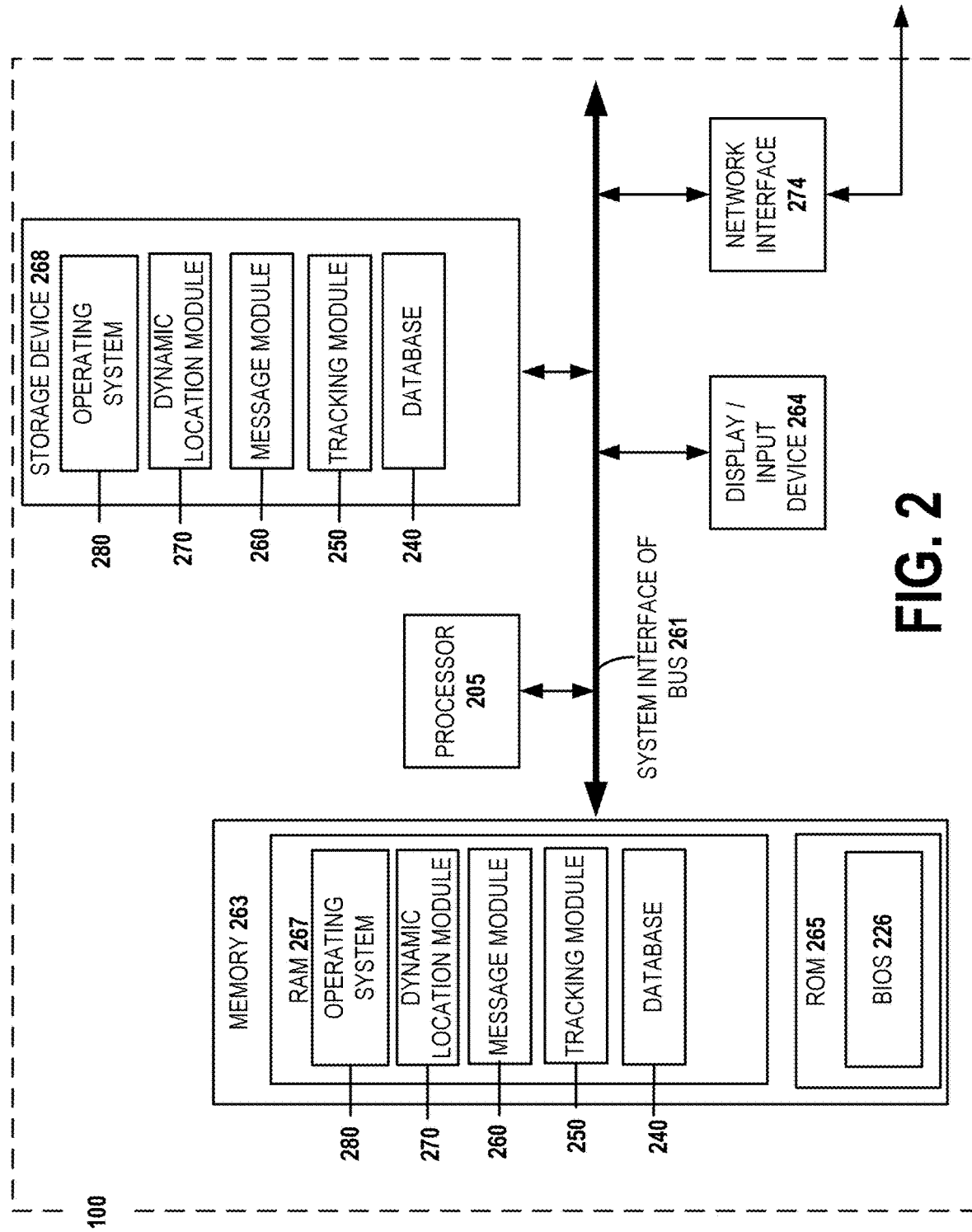
FIG. 2 is an exemplary schematic diagram of a computing entity according to one embodiment of the present invention.

FIG. 2 provides a schematic of a carrier system 100 according to one embodiment of the present invention. In general, the term "system" may refer to, for example, one or more computers, computing entities, computing devices, mobile phones, gaming consoles (e.g., Xbox, Play Station, Wii), desktops, tablets, notebooks, laptops, distributed systems, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As shown in FIG. 2, in one embodiment, the carrier system 100 may include or be in communication with one or more processing elements 205 (also referred to as processors, processing circuitry, and/or similar terms used herein interchangeably) that communicate with other elements within the carrier system 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

In an exemplary embodiment, the processor element 205 may be configured to execute instructions stored in memory or otherwise accessible to the processor element 205. As such, whether configured by hardware or software methods, or by a combination thereof, the processor element 205 may represent an entity capable of performing operations according to embodiments of the present invention when configured accordingly. A display device/input device 264 for receiving and displaying data may also be included in the carrier system 100. This display device/input device 264 may be, for example, a keyboard or pointing device that is used in combination with a monitor. The carrier system 100 may further include transitory and non-transitory memory 263, which may include both random access memory (RAM) 267 and read only memory (ROM) 265. The carrier system's ROM 265 may be used to store a basic input/output system (BIOS) 226 containing the basic routines that help to transfer information to the different elements within the carrier system 100.

In addition, in one embodiment, the carrier system 100 may include at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, or the like. Additionally, each of these storage devices 268 may be connected to the system bus 261 by an appropriate interface.

Furthermore, a number of executable instructions, applications, program modules, and/or the like may be stored by the various storage devices 268 and/or within RAM 267. Such executable instructions, applications, program modules, and/or the like may include an operating system 280, a dynamic location module 270, a message module 260, and tracking module 250. As discussed in more detail below, these executable instructions, applications, program modules, and/or the like may control certain aspects of the operation of the carrier system 100 with the assistance of the processor 205 and operating system 280—although their functionality need not be modularized. In addition to the program modules, the carrier system 100 may store or be in communication with one or more databases, such as database 240.

As indicated, in one embodiment, the carrier system 100 may also include one or more network interfaces 274 for communicating with various computing entities through the network 150, such as by communicating data, content, information, and/or similar terms used herein interchangeably that can be transmitted, received, operated on, processed, displayed, stored, and/or the like. For instance, the carrier system 100 may communicate possible dynamic delivery locations and/or times to a consignee's customer computing device 110. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the carrier system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, near field communication (NFC) protocols, Bluetooth protocols, wireless universal serial bus (USB) protocols, and/or any other wireless protocol.

As will be appreciated, one or more of the carrier system's 100 components may be located remotely from other carrier system 100 components, such as in a distributed system. Furthermore, one or more of the components may be combined and additional components performing functions described herein may be included in the carrier system 100. Thus, the carrier system 100 can be adapted to accommodate a variety of needs and circumstances. As will be recognized, these architectures and descriptions are provided for exemplary purposes only and are not limiting to the various embodiments.

2. Exemplary Mobile Station

Figure 3:
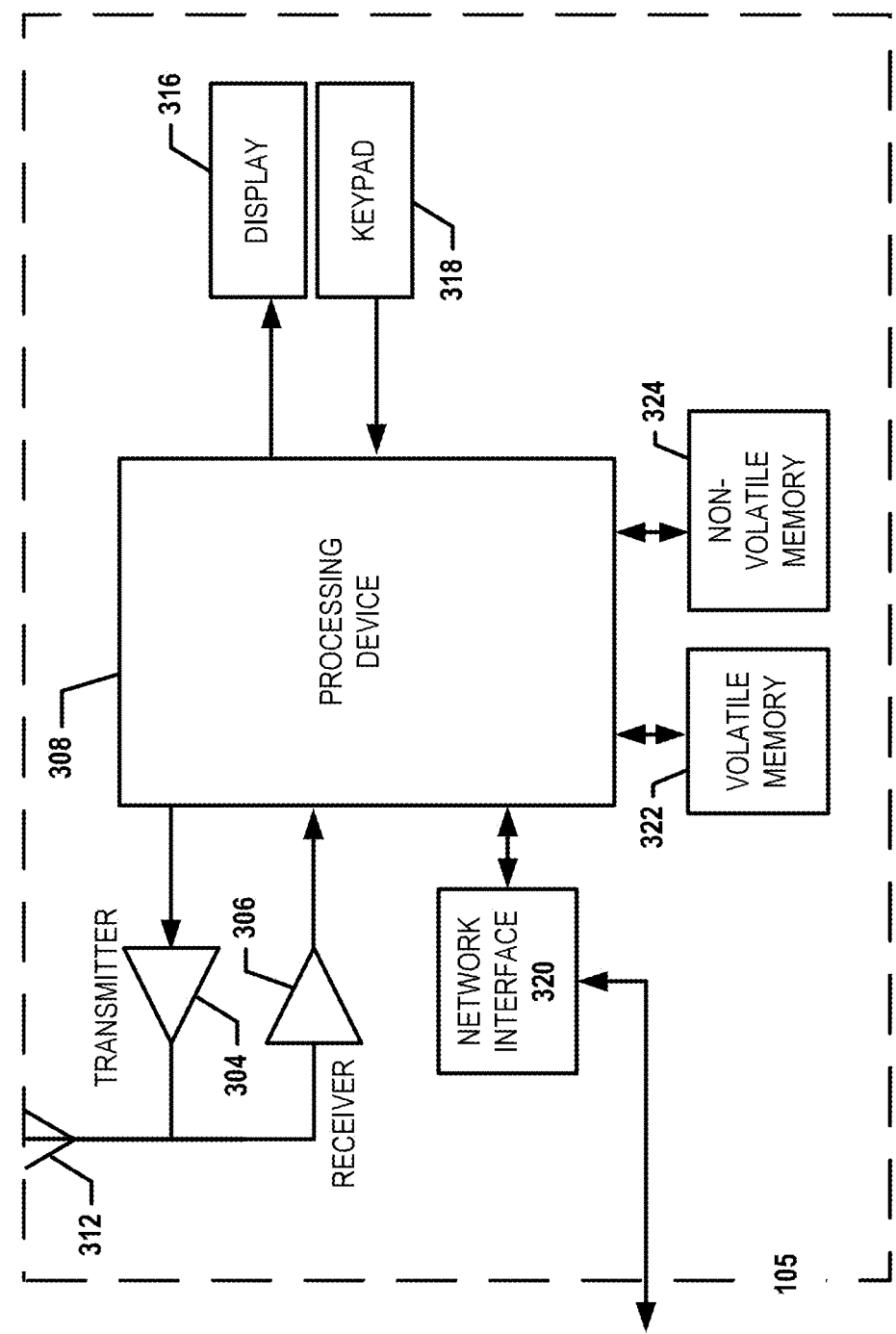
FIG. 3 is an exemplary schematic diagram of a mobile device according to one embodiment of the present invention.

FIG. 3 provides an illustrative schematic representative of a mobile station 105 that can be used in conjunction with the embodiments of the present invention. Mobile stations 105 can be operated by various parties, including carrier personnel (e.g., delivery drivers, sorters, and/or the like). As shown in FIG. 3, the mobile station 105 can include an antenna 312, a transmitter 304 (e.g., radio), a receiver 306 (e.g., radio), and a processing device 308 (e.g., a processor, controller, and/or the like) that provides signals to and receives signals from the transmitter 304 and receiver 306, respectively.

The signals provided to and received from the transmitter 304 and the receiver 306, respectively, may include signaling information in accordance with an air interface standard of applicable wireless systems. In this regard, the mobile station 105 may be capable of operating with one or more air interface standards, communication protocols, modulation types, and access types. More particularly, the mobile station 105 may operate in accordance with any of a number of wireless communication standards and protocols, such as those described above with regard to the carrier system 100. In a particular embodiment, the mobile station 105 may operate in accordance with multiple wireless communication standards and protocols (e.g., using a Gobi radio), such as GSM, UMTS, 1×RTT, and EVDO, and use multiple wireless carriers. To do so, the mobile station 105 may include integrated mobile reception diversity and integrated power management. Such a configuration can provide for global connectivity to the user.

Via these communication standards and protocols, the mobile station 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile station 105 can also download changes, add-ons, and updates, for instance, to its firmware, software (e.g., including executable instructions, applications, program modules), and operating system.

According to one embodiment, the mobile station 105 may include a location determining device and/or functionality. For example, the mobile station 105 may include a Global Positioning System (GPS) module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile station 105 may also comprise a user interface (that can include a display 316 coupled to a processing device 308) and/or a user input interface (coupled to the processing device 308). The user input interface can comprise any of a number of devices allowing the mobile station 105 to receive data, such as a keypad 318, a touch display, voice or motion interfaces, or other input device. In embodiments including a keypad 318, the keypad 318 can include the conventional numeric (0-9) and related keys (#, *), and other keys used for operating the mobile station 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile station 105 can also include volatile memory 322 and/or non-volatile memory 324, which can be embedded and/or may be removable. For example, the non-volatile memory may be embedded or removable MMCs, secure digital SD memory cards, Memory Sticks, EEPROM, flash memory, hard disk, or the like. The memory can store any of a number of pieces or amount of information and data used by the mobile station 105 to implement the functions of the mobile station 105. The memory can also store content, such as computer program code for an application and/or other computer programs.

3. Exemplary Mobile Asset

In various embodiments, a mobile asset 140 may be a tractor, a truck, a car, a motorcycle, a moped, a Segway, a trailer, a tractor and trailer combination, a golf cart, a van, a flatbed truck, a delivery vehicle, and/or the like. In one embodiment, each mobile asset 140 may be associated with a unique mobile asset identifier (such as a mobile asset ID) that uniquely identifies the mobile asset 140. The mobile asset 140 may be mobile in the sense that it may be able to move from one location to another under its own power. The unique mobile asset ID (e.g., trailer ID, tractor ID, vehicle ID, and/or the like) may include characters, such as numbers, letters, symbols, and/or the like. For example, an alphanumeric mobile asset ID (e.g., "1221A445533AS445") may be associated with each mobile asset 140. In another embodiment, the unique mobile asset ID may be the license plate, registration number, or other identifying information assigned to the mobile asset 140. FIG. 1 represents an embodiment in which the mobile asset 140 is a truck, a trailer, or a truck and trailer combination. FIG. 1 shows one or more computing entities, devices, and/or similar words used herein interchangeably that are associated with the mobile asset 140, such as a data collection device 130 or other computing entities.

Figure 4:
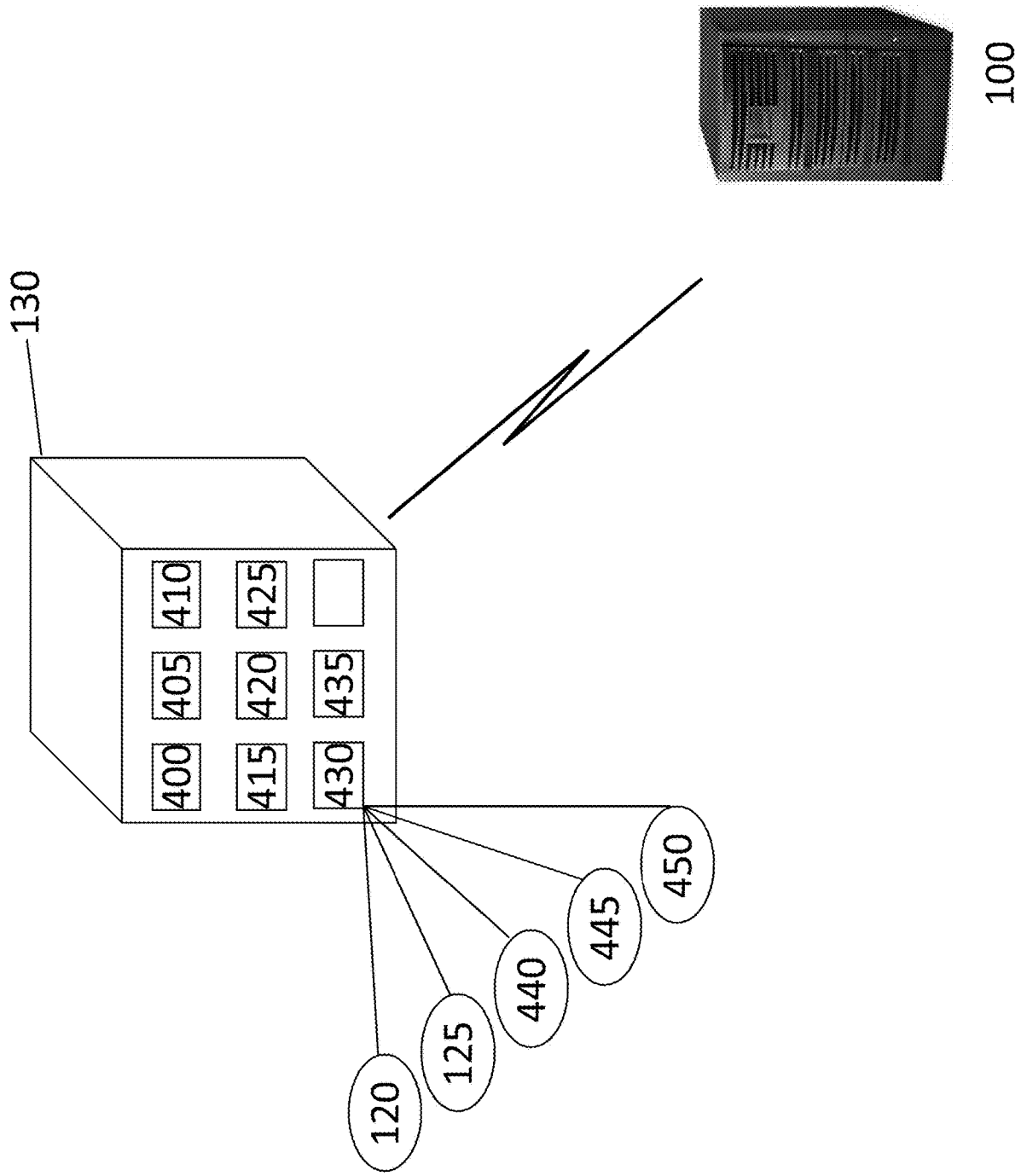
FIG. 4 is an exemplary schematic diagram of a data collection device that may be used in association with certain embodiments of the present invention.

FIG. 4 provides a block diagram of an exemplary data collection device 130 that may be attached, affixed, disposed upon, integrated into, or part of a mobile asset 140. The data collection device 130 may collect telematics data (including location data) and transmit/send the data to the mobile station 105 and/or the carrier system 100 via one of several communication methods.

In one embodiment, the data collection device 130 may include, be associated with, or be in communication with one or more processors 400, one or more location-determining devices or one or more location sensors 120 (e.g., Global Navigation Satellite System (GNSS) sensors), one or more telematics sensors 125, one or more real-time clocks 415, a J-Bus protocol architecture, one or more electronic control modules (ECM) 445, one or more communication ports 430 for receiving telematics data from various sensors (e.g., via a CAN-bus), one or more communication ports 405 for transmitting/sending data, one or more RFID tags/sensors 450, one or more power sources 420, one or more data radios 435 for communication with a variety of communication networks, one or more memory modules 410, and one or more programmable logic controllers (PLC) 425. It should be noted that many of these components may be located in the mobile asset 140 but external to the data collection device 130.

In one embodiment, the one or more location sensors 120 may be one of several components in communication with or available to the data collection device 130. Moreover, the one or more location sensors 120 may be compatible with a Low Earth Orbit (LEO) satellite system or a Department of Defense (DOD) satellite system. Alternatively, triangulation may be used in connection with a device associated with a particular vehicle and/or the mobile asset's driver and with various communication points (e.g., cellular towers or Wi-Fi access points) positioned at various locations throughout a geographic area to monitor the location of the mobile asset 140 and/or its driver. The one or more location sensors 120 may be used to receive latitude, longitude, altitude, geocode, course, position, time, and/or speed data—referred to herein as telematics data, location data, and/or geocode samples. The one or more location sensors 120 may also communicate with the carrier system 100, the data collection device 130, and/or similar computing entities.

As indicated, in addition to the one or more location sensors 120, the data collection device 130 may include and/or be associated with one or more telematics sensors 125. For example, the telematics sensors 125 may include vehicle sensors, such as engine, fuel, odometer, hubometer, tire pressure, location, weight, emissions, door, and speed sensors. The telematics data may include, but is not limited to, speed data, emissions data, RPM data, tire pressure data, oil pressure data, seat belt usage data, distance data, fuel data, idle data, and/or the like (e.g., telematics data). The telematics sensors 125 may include environmental sensors, such as air quality sensors, temperature sensors, and/or the like. Thus, the telematics data may also include carbon monoxide (CO), nitrogen oxides (NOx), sulfur oxides (SOx), ozone ($O_3$), hydrogen sulfide ($H_2S$) and/or ammonium ($NH_4$) data, and/or meteorological data (e.g., telematics data).

In one embodiment, the ECM 445 may be one of several components in communication with and/or available to the data collection device 130. The ECM 445, which may be a scalable and subservient device to the data collection device 130, may have data processing capability to decode and store analog and digital inputs from vehicle systems and sensors. The ECM 445 may further have data processing capability to collect and present telematics data to the J-Bus (which may allow transmission to the data collection device 130), and output standard vehicle diagnostic codes when received from a vehicle's J-Bus-compatible on-board controllers 440 and/or sensors.

As indicated, a communication port 230 may be one of several components available in the data collection device 130 (or be in or as a separate computing entity). Embodiments of the communication port 430 may include an Infrared data Association (IrDA) communication port, a data radio, and/or a serial port. The communication port 430 may receive instructions for the data collection device 130. These instructions may be specific to the mobile asset 140 in which the data collection device 130 is installed, specific to the geographic area in which the mobile asset 140 will be traveling, and/or specific to the function the mobile asset 140 serves within a fleet. In one embodiment, the data radio 435 may be configured to communicate with a wireless wide area network (WWAN), wireless local area network (WLAN), wireless personal area network (WPAN), or any combination thereof. For example, the data radio 435 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol.

4. Item Computing Device and/or Sensor

In some embodiments, the item may be associated with an item computing device and/or item sensor 160 (e.g., RFID tag, smart phone, computer, etc.) that accompanies the item as it travels to a final destination. The computing device and/or sensor 160 may have some of the same capabilities as the mobile station 105. For example, the item computing device and/or item sensor 160 may include an antenna, a transmitter (e.g., radio), a receiver (e.g., radio), and a processing device (e.g., a processor, controller, and/or the like) that provides signals to and receives signals from the transmitter and receiver, respectively. The signals provided to and received from the transmitter and the receiver, respectively, may include signaling information in accordance with an air interface standard of applicable wireless systems as generally described above with reference to the mobile station 105.

According to one embodiment, the item computing device and/or item sensor 160 may also include a location determining device and/or functionality. For example, the item computing device and/or item sensor 160 may include a Global Positioning System (GPS) module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The item computing device and/or item sensor 160 may also comprise a user interface. The user input interface can comprise any of a number of devices allowing the item computing device and/or item sensor 160 to receive data, such as a keypad, a touch display, voice or motion interfaces, or other input device. In embodiments including a keypad, the keypad can include the conventional numeric (0-9) and related keys (#, *), and other keys used for operating the item computing device and/or item sensor and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The item computing device and/or item sensor 160 can also include volatile memory and/or non-volatile memory, which can be embedded and/or may be removable. For example, the non-volatile memory may be embedded or removable MMCs, secure digital SD memory cards, Memory Sticks, EEPROM, flash memory, hard disk, or the like. The memory can store any of a number of pieces or amount of information and data used by the item computing device and/or item sensor 160 to implement the functions of the item computing device and/or item sensor 160. The memory can also store content, such as computer program code for an application and/or other computer programs.

5. Exemplary Customer Computing Device

The customer computing devices 110 may each include one or more components that are functionally similar to those of the carrier system 100 and/or mobile station 105. For example, in one embodiment, each of the customer computing devices may include: (1) a processor that communicates with other elements via a system interface or bus; (2) a user interface; (3) transitory and non-transitory memory; and (4) a communications interface. As noted, the consignee's customer computing device 110 may comprise a user interface (that can include a display device/input device coupled to a processing element) and/or a user input interface (coupled to a processing element). For example, the user interface may be a carrier application, browser, user interface, dashboard, webpage, and/or similar words used herein interchangeably executing on and/or accessible via the consignee's customer computing device 110 to interact with and/or cause display of information from the carrier system 100, as described herein. These architectures are provided for exemplary purposes only and are not limiting to the various embodiments. The term "computing device" is used generically to refer to any computer, computing device, desktop, notebook or laptop, distributed system, carrier system, gateway, switch, or other processing device adapted to perform the functions described herein. It should be noted that customer computing devices may be used by shippers, consignee as well as their agents.

III. EXEMPLARY SYSTEM OPERATION

Figure 5:
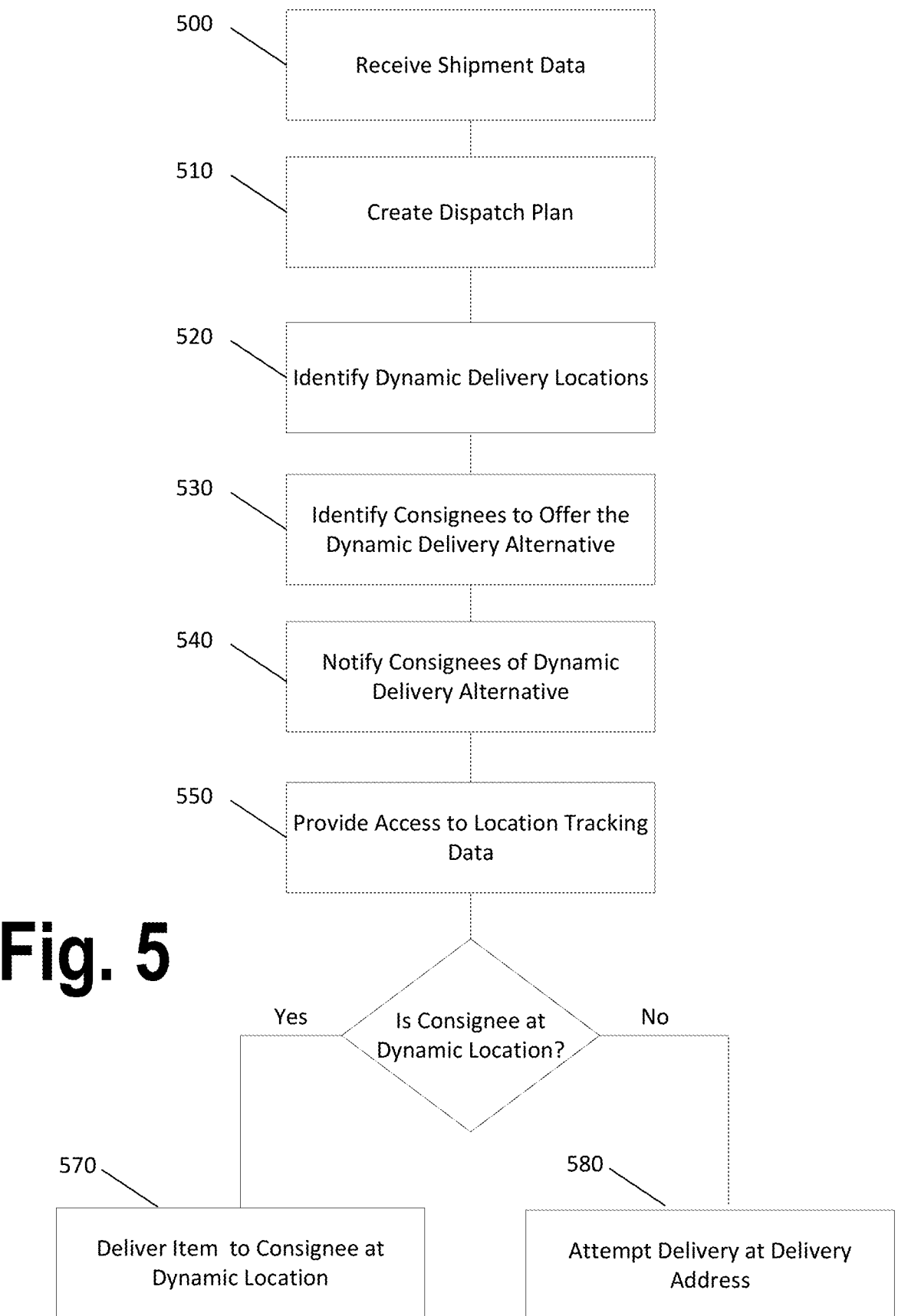
FIG. 5 is a flowchart illustrating operations and processes that can be used in accordance with various embodiments of the present invention.
Figure 6:
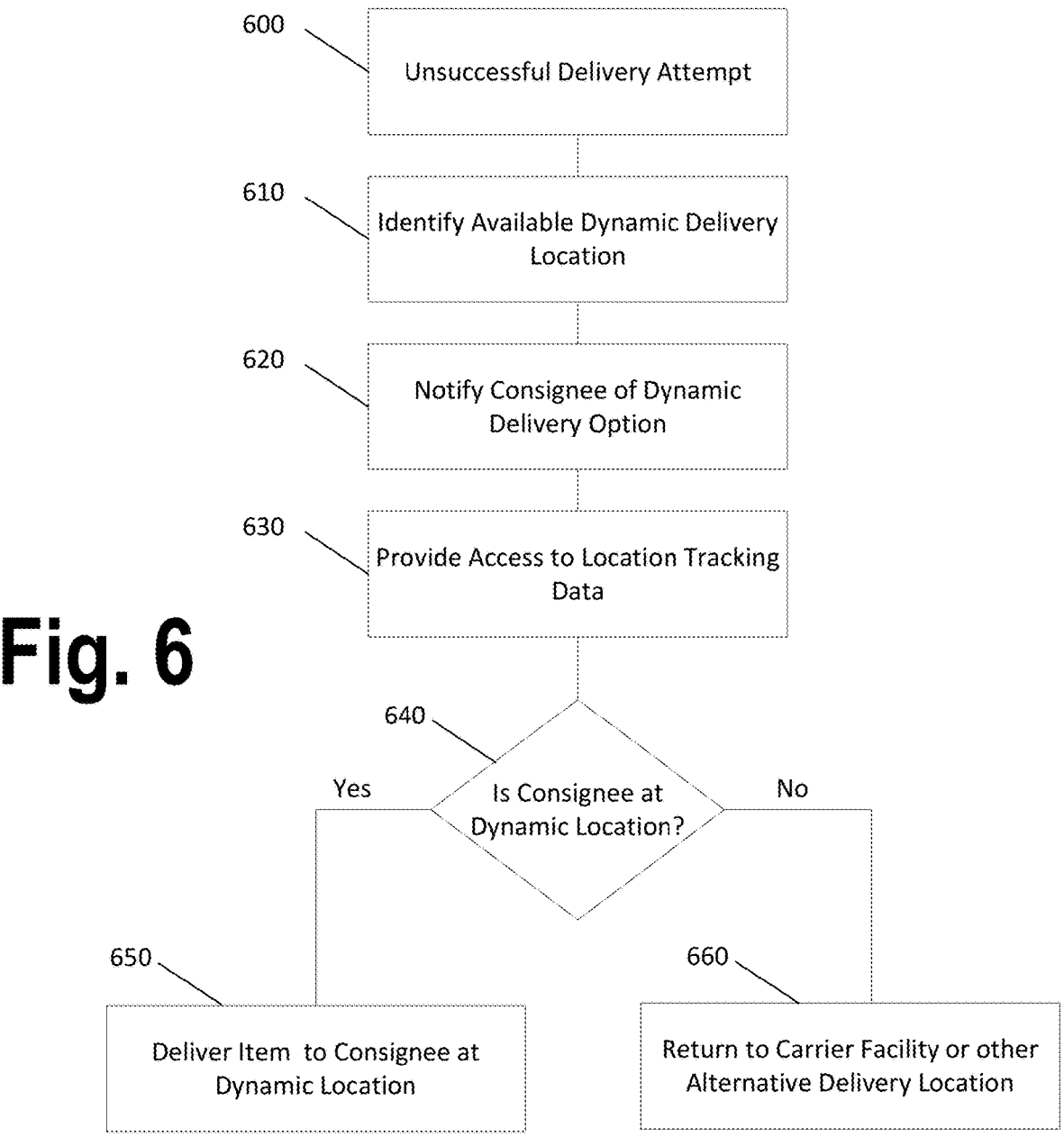
FIG. 6 is a flowchart illustrating operations and processes that can be used in accordance with various embodiments of the present invention.

Reference will now be made to FIGS. 5 and 6 which are flowcharts illustrating operations and processes that may be performed for providing alternative delivery options to customers. FIG. 5 illustrates operations and processes that may be performed in providing a dynamic delivery option prior to a delivery attempt to an address associated with an item. FIG. 6 illustrates operations and processes that may be performed in providing a dynamic delivery option following an unsuccessful attempt to deliver an item to an address associated with an item.

1. Initiating A Shipment

Generally, a shipper can ship an item from one location to a consignee at a different location by employing the services of a carrier that operates the carrier system 100. As will be recognized, an item may be a parcel or group of parcels, a package or group of packages, scrap metal banded together, a vehicle part, a box, a crate, a drum, a box strapped to a pallet, and/or the like.

In one embodiment, as indicated in Block 500 of FIG. 5, the shipper may initiate the shipping process by entering identifying information into the carrier system 100. A shipper may be an individual, a family, a company, an organization, an entity, a department within an organization, a representative of an organization and/or person, and/or the like. In various embodiments, the shipper (e.g., a shipper or shipper representative operating a shipper's customer computing device 110) may access a webpage or portal of a carrier, such as United Parcel Service of America, Inc. (UPS) and/or contact the carrier through social media. For instance, the carrier system 100 may transmit a webpage that provides the shipper with an option of logging into an existing account, opening a new account or entering shipping information as a "guest" for a customer pickup and/or delivery of an item. U.S. application Ser. No. 14/025,893, entitled Customer Controlled Management of Shipments and filed on Sep. 13, 2013, describes various processes in which a shipper (and/or consignee) may establish an account and this application is incorporated herein in its entirety by reference.

Assuming the shipper already has a shipper account or has established a new account, the shipper (e.g., a shipper or shipper representative operating a shipper's customer computing device 110) may login to the webpage or portal, e.g., by providing an associated username and password. Alternatively, the shipper may enter identifying information as a "guest" without establishing an account. The shipper may also contact the carrier via social media.

Once the shipper is identified (e.g., as an account holder or guest), the shipper may initiate a shipment. In various embodiments, the one or more carrier system 100 may then provide a user interface (e.g., browser, dashboard, application) for the shipper to provide shipment data which includes certain details regarding the proposed shipment. In various embodiments, the shipment data may include a name, street address, city, state, postal code, country, telephone number and the like for both the shipper and the consignee. In various embodiments, the user interface may comprise a fillable form with fields including ship-from data and ship-to data. In various embodiments, some of the data fields may be pre-populated. For example, if the shipper logged into a registered account, the address data entered during registration may be pre-populated in the ship-from data fields. In some embodiments, the shipper may also have an associated address book comprising address data for possible consignees (e.g., ship-to addresses).

In one embodiment, once the carrier system 100 receives the ship-to and ship-from information from the shipper, the carrier system 100 may perform one or more validation operations. For example, the carrier system 100 may determine whether the primary address (and/or other addresses) in the specified country or postal code is eligible for a pickup or delivery. The carrier system 100 may also determine whether the primary address (and/or other secondary addresses) is valid, e.g., by passing the primary address through one or more address cleansing or standardization systems. The carrier system 100 may perform a variety of fraud prevention measures as well, such as determining whether the shipper or one of the delivery addresses has been "blacklisted" from customer pickup and/or delivery. As will be recognized, a variety of other approaches and techniques can be used to adapt to various needs and circumstances.

In addition to ship-to and ship-from data, the shipment data may also include information regarding the shipment itself. For the example, the number of packages, the weight and sizes of the packages and the service level. The service level options may be for example Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like.

In one embodiment, the interface (e.g., browser, dashboard, application) in communication with the carrier system 100 can be used to provide notifications sent during various stages of the delivery process. In some embodiments, the shipper can identify one or more communication formats for communicating the message to the consignee. In other embodiments, the communication preferences may be established in the shipper and/or consignee account. The communication formats may include text messages (e.g., Short Message Service (SMS) and/or Multimedia Messaging Service (MMS), email messages, voice messages, and/or a variety of other messages in various communication formats. In various embodiments, the shipper may be prompted by the carrier system 100 to provide contact information for sending the message pursuant to the desired communication format. For instance, for text messages, the shipper may provide one or more cellular phone numbers. For email messages, the shipper may provide one or more email addresses. And for voice messages, the shipper may provide one or more cellular or landline phone numbers. In other embodiments, the contact information is provided in the associated profiles.

Once the shipment data has been entered and validated, the carrier system 100 may generate an item/shipment identifier and a digital representation of a label for use by the shipper for the shipment. In various embodiments, the carrier system 100 sends the digital representation of the label to the shipper computer device such that the label may be printed. In various embodiments, the label may include both human-readable indicia and machine readable indicia such as such as a barcode, a MaxiCode, electronic representation, and/or text (e.g., alphanumeric text).

The unique item/shipment identifier (e.g., 123456789) may be used by the carrier to identify and track the item as it moves through the carrier's transportation network. Such item/shipment identifiers can be affixed to items by, for example, using a label (e.g., sticker) with the unique item/shipment identifier printed thereon (in human and/or machine readable form) or an RFID tag with the unique item/shipment identifier stored therein.

2. Establishing a Dispatch Plan

As will be understood by those skilled in the art, a carrier accumulates shipment data associated with items to be delivered and assigns the items to delivery routes for transporting the items through one or more facilities in the carrier's delivery network. In addition, the carrier also creates a dispatch plan for performing the final delivery of the item from a facility to a delivery address (see Block 510).

The dispatch plan identifies a sequence of service stops and associated deliveries for a mobile asset 140 to perform in a particular time frame (e.g., a work shift, a portion of a shift, etc.) In some cases a service stop may be associated with one or more delivery addresses for delivery of one or more items. For example, a delivery stop may be a shopping mall where deliveries are made to multiple commercial locations within the shopping mall. Additionally, a delivery stop may be associated with a single residential address or multiple residential addresses. U.S. Pat. No. 7,624,024 entitled Systems and Methods for Dynamically Updating a Dispatch Plan, filed Apr. 18, 2005 provides a general description of dispatch plans and how these plans may be generated and updated. U.S. Pat. No. 7,624,024 is incorporated herein in its entirety by reference. The dispatch plan may include stop locations, estimated arrival times at the stop locations and estimated departure times from the stop locations (e.g., a stop duration).

3. Determining Possible Dynamic Delivery Alternatives

After a dispatch plan is generated, the carrier system 100 (e.g., via the dynamic location module 270) may identify possible dynamic delivery locations at Block 520. Initially, the carrier system 100 may identify candidate service stops within the delivery route which may be used as possible dynamic delivery locations. Dynamic delivery locations may be identified by applying various business rules to the service stops along a delivery route as specified by a dispatch plan. In some embodiments, the business rule may specify that only service stops in which the estimated time at the stop exceeds a predetermined threshold or the number of deliveries associated with a given stop exceeds a threshold would be a candidate for a dynamic delivery location. For example, the carrier system 100 may compare the stop duration data from the dispatch plan against a predetermined threshold. In some embodiments, a business rule may specify that a predetermined number of service stops within a predetermined distance threshold may, as a group, represent a candidate dynamic delivery location (e.g., within a neighborhood, on same street, with a shopping center, etc.). For example, the carrier system 100 may establish all stops within a given neighborhood as candidate dynamic delivery locations. In some embodiments, the business rules may specify that some or all commercial stops may be considered candidate dynamic delivery locations or that all service stops may be candidate dynamic delivery locations.

The business rules may place other limits on the delivery stops that may qualify as dynamic delivery locations such as, for example, limiting dynamic delivery locations to low crime rate areas, to locations with visibility from public roadways, to stops with available vehicle parking and/or stops that have a threshold delivery frequency. The stop characteristics data may include historical information relating to the various stops stored in memory associated with the carrier system 100 and the business rules may be applied to the stored data to identify stops qualifying as dynamic delivery locations. In various embodiments, one or more of the dynamic delivery locations may be added delivery stops that are not associated with a particular delivery but rather are locations in which the mobile asset 105 may park for a predetermined time frame to receive and/or deliver items.

At Block 530, the carrier system 100 may identify which consignees are offered one or more of the identified dynamic delivery locations. In some embodiments, the carrier system identifies all of the deliveries associated with stops scheduled to occur prior to the stop at an identified dynamic delivery location as possible candidates to offer the dynamic delivery alternative. In some embodiments, only consignees that have an account and/or customer profile with the carrier are qualified to be offered dynamic delivery locations. U.S. application Ser. No. 14/025,893, which is incorporated above by reference, describes systems and methods for registering for an account and how that account may operate.

In some cases, the carrier system 100 only identifies some of the deliveries scheduled to occur prior to an identified dynamic delivery location. For example, the carrier system 100 may only identify deliveries that are within a predetermined distance threshold of the dynamic delivery location or deliveries that are scheduled to be delivered within a given time threshold of the dynamic delivery location.

In some embodiments, some of the consignees may have an account with the carrier which establishes a series of delivery preferences as generally described in U.S. application Ser. No. 14/025,893. These preferences may include a primary delivery address and one or more secondary delivery addresses. In some cases, the profile may associate certain addresses for delivery of items on certain days/times and deliveries to other addresses on other days/times. In the event a consignee has a customer profile, the carrier system 100 may identify dynamic delivery locations that are within a predetermined distance threshold from the primary and/or secondary addresses provided in the consignee's profile. In some embodiments, the carrier system 100 may identify dynamic delivery locations that are within a predetermined time threshold from the estimated delivery time for primary and/or secondary addresses provided in the consignee's profile.

4. Communicating Possible Delivery Alternatives to a Consignee

After certain consignees are identified for the one or more dynamic delivery addresses, the carrier system 100 (e.g., via the message module 260) may notify the associated consignee(s) with the one or more delivery addresses at Block 540 and provide an opportunity for the consignee to select the alternative delivery option. In various embodiments, a notification may be sent to a consignee, using contact information retrieved from the shipment data and/or consignee profile, offering to deliver the item to a dynamic delivery location. The notification may provide information regarding the one or more dynamic delivery location(s) and estimated time(s) at the dynamic delivery location(s). In some embodiments, the notification may include a hyperlink to a webpage providing location data regarding the candidate dynamic delivery location(s) and estimated time at the dynamic delivery location(s) (e.g., based on the dispatch plan). In various embodiments, the notification may include a unique identifier for use in validating the identity of the consignee (or agent of the consignee) when the delivery is made. The unique identifier may be text, barcodes, Aztec Codes, MaxiCodes, Data Matrices, Quick Response (QR) Codes, electronic representations, and/or the like. This identifier may be used alone or in conjunction with other identification information (e.g., government issued identification, etc.)

In various embodiments, the carrier system 100 sends the notification on the morning the item is scheduled to be delivered to the consignee. In some embodiments, the carrier system 100 may send the notification prior to the day the item will be delivered, but after the carrier receives the item from the shipper. For example, the carrier system 100 may send the notification the day before the scheduled delivery.

In various embodiments, the consignee may respond to the communication with an indication that the consignee desires to meet the mobile asset 140 at the dynamic delivery location at the estimated delivery time. In other embodiments, the consignee may attempt to meet with the mobile asset 140 at the dynamic delivery location and estimated time without responding to the notification offer. In some embodiments, the notification may include contact information for the associated delivery driver. In this case, the consignee may communicate directly with the driver regarding the dynamic delivery location.

5. Tracking the Mobile Asset

In event the consignee indicates a desire to retrieve the item at the dynamic delivery location, the carrier system 100 (e.g., via the tracking module 250) may provide tracking information to the consignee indicating the location of the mobile asset 140, mobile station 105 and/or the item computing device 160 prior to arrival at the dynamic delivery location at Block 550. In various embodiments, the carrier system 100 receives location information (e.g., GPS location) for the mobile asset 140 periodically or during certain delivery events. For example, the location of the mobile asset 140 may be transmitted to the carrier system when the mobile asset 140 has been parked for a threshold time. Similarly, the location of the mobile station 105 may be transmitted to the carrier system periodically or during certain delivery events (e.g., when item is delivered). Furthermore, the item computing device 160 may periodically send location data to the carrier system 100. Using these sources of location information independently or in any combination, the carrier server 100 may have an approximate real-time or near real-time location of the mobile asset 140, mobile station 105, and/or item computing device 160. The carrier system 100 may provide temporary access to this location data such that the consignee will know when the mobile asset 140 is approaching/arriving at the dynamic delivery location. In some embodiments, the mobile asset 140, mobile station 105 and/or item computing device may communicate location information directly to the consignee's customer computing device.

In some embodiments, the source of the location data may be determined based on the proximity of the devices to each other. For example, if the location data for the mobile asset 140, mobile station 105 and the item computing device 160 are within a predetermined threshold distance, location data for one of the devices may take priority (e.g., location data for the mobile asset 140 is used when location data for all devices are within a distance threshold). However, when only the mobile station 105 and the item computing device 160 are within the same or a different threshold distance, the mobile station 105 location data may be used. Similarly, when only the mobile asset 140 and the item computing device location data is within a predetermined threshold, the mobile asset 140 location data is used. Further, when none of the devices are within a threshold distance, only the item computing device 160 location data may be used. It should be understood that the threshold distances may change based on the number of devices and the types of devices.

In various embodiments, access to the mobile asset 140, mobile station 105, and/or item computing device 160 location data by particular consignees may be granted based on trigger events. For example, the consignee may be granted access to the location data once the mobile asset 140, mobile station 105, and/or item computing device location data is within an estimated time threshold from the dynamic delivery location (e.g., 30 minutes, 1 hour, 2 hours, etc.) This may be determined based on the estimated times in the dispatch plan or updated times based on the progress made with respect to the dispatch plan. In some embodiments, the access may be granted when the mobile asset 140, mobile station 105, and/or item computing device 160 is within a given distance threshold of the dynamic delivery location (e.g., within geofence around location). For example, mobile asset 140, mobile station 105, and/or item computing device 160 may send GPS location data to the carrier system 100 and the carrier system by trigger access to the location data when the GPS location data indicates the mobile asset 140, mobile station 105, and/or item computing device 160 has entered a geofenced area associated with the candidate dynamic delivery location. Also, in some embodiments, the access may be granted when the dynamic delivery location is within certain number of delivery stops where the sequence is determined based on the dispatch plan. For unsuccessful delivery attempts, the trigger event may include (1) when the unsuccessful delivery attempt is recorded by the mobile station 105, (2) when the item is placed back into the vehicle, (3) when the item computing device location exists a geofence associated with the delivery address and the like. Various embodiments may be use any combination of these trigger events. The access to the location data by the consignee may expire after a predetermined time period (e.g., 1 hour, 2 hours, etc.), when the mobile asset 140, mobile station 105 and/or item computing device 160 is no longer within a given threshold distance of the dynamic delivery location (e.g., exits geofenced location), after the first or last delivery is made at the dynamic delivery location or the like.

In various embodiments, the carrier server 100 may send the consignee a notification when the access trigger event occurs. The notification would be sent using the contact information associated with the shipment data and/or consignee profile. The notification may include a hyperlink to a webpage providing the location information. In various embodiments, the location information may be overlaid onto a digital map. In some embodiments, the current location of the mobile asset 140, mobile station 105, and/or item computing device 160 is identified on the map and this indication may move as the location information is updated. In further embodiments, a portion or the entire projected route of the mobile asset 140 based on the dispatch plan may be overlaid onto the digital map as well.

The digital map may include an indication showing the current location of the mobile asset 140, mobile station 105, item computing device and/or the location of the dynamic delivery location. The digital map may optionally include a time-to-arrival indicator showing the estimated time until the mobile asset 140 arrives at the dynamic delivery location. The time-to-arrival indicator can be in the form of numbers showing the estimated time until arrival, or it can be in the form of symbols showing the estimated time until arrival. As a non-limiting example, the map may use a red symbol to indicate that the mobile asset will not arrive within the next one hour, a yellow symbol to indicate that the mobile asset will arrive within the next one hour, and a green symbol to indicate that the mobile asset is currently located at the dynamic delivery location.

In some embodiments, the consignee may send the carrier system 100 an estimated time of arrival of the consignee at the dynamic delivery location. The consignee may communicate with the carrier by telephone, fax, email, text message, twitter, social networking, or other one-way or two-way communication techniques. Consignee can also send this information to the carrier system 100 to allow the driver to see the consignee approaching the meet point. In some embodiments, the consignee may allow the carrier to track the location of the consignee using location data retrieved/transmitted from the consignee's customer computing device 110, a location device associated with the consignee's vehicle or the like. The carrier system 100 may send this consignee location data to the mobile asset 140 or mobile station 105 such that the driver can view the current location of the consignee. In various embodiments, the consignee may limit the amount of time the carrier and driver can access the location data. As a non-limiting example, the consignee may specify that the location data is only accessible for 45 minutes. Alternatively, the consignee may specify that the location data is only available until the consignee arrives at the dynamic delivery location. If the consignee allows the driver and/or carrier to view the location of the consignee, the carrier and/or carrier system 100 may automatically inform the driver when the consignee arrives at the dynamic delivery location.

6. Making a Delivery According to a Delivery Alternative

In various embodiments, upon arrival at the dynamic delivery location, the driver will provide service (e.g., pick-up and/or deliver items) to addresses associated with the delivery stop. In some embodiments, it will be the responsibility of the consignee (or an agent of the consignee) to locate/contact the driver at the dynamic delivery location to facilitate delivery of the consignee's item(s). In some embodiments, the driver may wait with the mobile asset 140 until the consignee arrives at the dynamic delivery location or for some predetermined time period (e.g., 10 minutes, 15 minutes, etc.) If the driver does not wait with the mobile asset 140 until the consignee arrives, the consignee may wait with the mobile asset 140 until the driver returns to the mobile asset 140 after completing the deliveries scheduled for that location. For example, if the dynamic delivery location is a shopping center at which there are other scheduled deliveries, the driver may be delivering other items to other consignees when the consignee arrives at the mobile asset 140. The dynamic delivery consignee may then wait with the mobile asset 140 until the driver returns from the deliveries. In some embodiments, the dynamic delivery consignee may communicate with the driver to inform the driver that the consignee has arrived. For example, the dynamic delivery consignee may use the consignee's customer computing device 110 to communicate with the carrier system 100 via the carrier's website, which can then inform the driver that the consignee has arrived. Alternatively, the dynamic delivery consignee may be provided contact information for the driver with the earlier described notifications and then communicate directly with the driver. The communication between the dynamic delivery consignee and the driver may be in the form of a telephone call, text message, email message, or other form of communication between the consignee's customer computing device 110 and the driver's mobile station 105.

Once the consignee and driver meet, the driver may initiate delivery of the item at Block 570. In various embodiments, the carrier may require the consignee to verify the consignee's identity prior to the driver delivering the item. The driver may verify the consignee's identity by viewing some form of personal identification, such as a passport or driver's license or by capturing or otherwise reviewing the unique identification provided in an earlier notification (e.g., text, barcodes, Aztec Codes, MaxiCodes, Data Matrices, Quick Response (QR) Codes, electronic representations, and/or the like.). In one embodiment, the driver may validate a consignee's identity by utilizing a third party to match the consignee's cell phone number and address to the item in order to ensure the person requesting delivery of the item is the intended consignee. In this embodiment, the consignee can visit the carrier's website (e.g. ups.com) either in the presence of the driver or prior to the alternative delivery time. The website may direct the consignee to enter both a tracking number associated with the item to be delivered and a cell phone number. The tracking number and cell phone number can then be forwarded to a third party entity who determines whether the delivery address and the provided cell phone number match with the unique item/shipment identifier. If the third party entity determines that the provided information matches with the item information, the third party entity may send a confirmation code to the consignee. The confirmation code can be in the form of an alpha-numeric character string, text, barcodes, Aztec Codes, MaxiCodes, Data Matrices, Quick Response (QR) Codes, electronic representations, and/or the like. The consignee may then show the confirmation code to the driver, who can confirm its legitimacy and deliver the item to the consignee at Block 570.

In an alternative embodiment, the driver may validate the consignee's identity using an electronic card reader or other similar device known in the art. The consignee can swipe or scan any government issued form of identification using the electronic card reader or similar device.

In yet another embodiment, the consignee may present any form of identification to the driver for verification. The driver can then verify that the person requesting delivery is the intended consignee for the item. If the driver is satisfied that the person requesting delivery is the intended consignee, the driver delivers the item to the consignee. If the driver determines that the presented form of identification is insufficient to validate the identity of the consignee, the driver may refuse to deliver the package according to the delivery alternative, and may attempt to deliver the item at the original delivery address associated with the item. Alternatively, the driver may not verify the consignee's identity.

If the driver successfully delivers the item according to the delivery alternative, the carrier or carrier system 100 may update the dispatch plan by removing the consignee's delivery address from the dispatch plan for the mobile asset (see e.g., U.S. Pat. No. 7,624,024 which generally describes methods for updating a dispatch plan). If the carrier or the carrier system 100 removes the consignee's delivery address from the predetermined delivery route, the mobile asset may not stop at the associated delivery stop. If the carrier or carrier system 100 removes the consignee's delivery address from the predetermined delivery route, the carrier or carrier system 100 may update the dispatch plan using the methods and systems described above.

If the consignee is not present while the mobile asset 140 is located at the dynamic delivery location, the carrier may attempt to deliver the package to the consignee using the original address at Block 590. As will be understood, this method of delivery is well known to those skilled in the art.

7. Dynamic Delivery Location after Unsuccessful Delivery Attempt

In various embodiments, a consignee may be offered a dynamic delivery location after an unsuccessful delivery attempt is made at the delivery address for the item. This process would begin with the unsuccessful delivery attempt at Block 600 in FIG. 6. The unsuccessful delivery attempt may or may not be following a failed dynamic delivery attempt At Block 610, the carrier system 100 may identify possible dynamic delivery locations. The dynamic delivery location may have been previously identified or identified following the unsuccessful delivery attempt (e.g., by applying the some or all of the business rules noted above). For example, in some embodiments, a business rule may specify that only service stops in which the estimated time at the stop exceeds a predetermined threshold or the number of deliveries associate with a given stop exceeds a threshold would be a candidate for an dynamic delivery location. As noted above, the dispatch plan includes estimated stop duration data. In some embodiments, a business rule may specify that a predetermined number of service stops within a predetermined distance threshold may as a group represent a candidate dynamic delivery location (e.g., within a neighborhood, on same street, with a shopping center, etc.). In some embodiments, the business rules may specify that some or all commercial stops may be considered candidate dynamic delivery locations or that all service stops may be dynamic delivery locations. In various embodiments, one or more of the dynamic delivery locations may be added delivery stops that are not associated with a particular delivery but rather are locations in which the mobile asset may park for a predetermined time frame to receive and/or deliver items. The business rules regarding limitations discussed above may also apply.

In addition, there may be business rules that specify which consignees and or shipments are offered dynamic delivery alternatives following an unsuccessful delivery attempt. For example, in some embodiments, the carrier system identifies all of the deliveries associated with stops scheduled to occur after to the unsuccessful delivery attempt address as possible the dynamic delivery locations. In some embodiments, only consignees that have an account and/or customer profile with the carrier are qualified to be offered dynamic delivery locations after unsuccessful delivery attempts. U.S. application Ser. No. 14/025,893, which is attached as Appendix C and incorporated above by reference, describes systems and methods for registering for an account and how that account may operate.

In some cases, the carrier system 100 only identifies some of the deliveries scheduled to occur after an unsuccessful delivery attempt as possible dynamic delivery locations. For example, the carrier system 100 may only identify deliveries that are within a predetermined distance threshold of the unsuccessful delivery attempt or deliveries that are scheduled within a given time threshold of the unsuccessful delivery attempt.

In some embodiments, where a consignee has a customer profile, the carrier system 100 may identify dynamic delivery locations that are within a predetermined distance threshold from the primary and/or secondary addresses provided in the consignee's profile. In some embodiments, the carrier system 100 may identify dynamic delivery locations that are within a predetermined time threshold from the estimated delivery time for primary and/or secondary addresses provided in the consignee's profile.

In some embodiments, the consignee may not have a customer profile. In case, the shipper may have provided contact information for the consignee with the shipping information. Using this contact information, the consignee may be contacted with respect to possible dynamic delivery locations.

After identifying available dynamic delivery locations at Block 610, the carrier system 100 may send a notification to the consignee regarding the dynamic delivery option at Block 620. If accepted, the consignee may be given temporary access to location information regarding the mobile asset and/or mobile station at Block 630. As discussed above, the access may be granted based on trigger events. These trigger events may be based on time, location, delivery events and the like. For example, the consignee may be granted access to the location data once the mobile asset 140 and/or mobile station 105 is within an estimated time threshold from the dynamic delivery location (e.g., 30 minutes, 1 hour, 2 hours, etc.) In some embodiments, the access may be granted when the mobile asset is within a given distance threshold of the dynamic delivery location (e.g., within geofence around location). Also, in some embodiments, the access may be granted when the dynamic delivery location is within certain number of delivery stops. The access to the location data by the consignee may expire after a predetermined time period (e.g., 1 hour, 2 hours, etc.), when the mobile asset is no longer within a given threshold distance of the dynamic delivery location (e.g., exits geofenced area), after the first or last schedule delivery is made at the dynamic delivery location or after the unsuccessful delivery attempt. Various embodiments may be use any combination of these trigger events.

In various embodiments, the consignee may be sent a notification when the access trigger event occurs. The notification would be sent using the contact information associated with the shipment data and/or consignee profile. The notification may include a hyperlink to a webpage providing the location information. In various embodiments, the location information may be overlaid onto a digital map.

After determining the consignee is at the dynamic delivery location at Block 640, the driver may deliver the item to the consignee. In various embodiments, the driver may confirm the identity of the consignee (or an agent of the consignee) as generally described above. In the event the consignee is not at the dynamic delivery location, the carrier may return the item to a carrier facility for a will call pickup or later attempted delivery or may deliver the item to another alternative delivery location at Block 660.

8. Accepting a Package from a Shipper According to an Alternative Drop-Off

The above described method and system for delivering an item according to an alternative delivery option can also be used for a carrier to pick up an item. When using the above described method to pick up an item, the carrier can communicate with the shipper to propose an alternative pick-up location and time in the same manner as described above for communicating a dynamic delivery location and time to a shipper. The carrier can provide the same mobile asset 140 arrival information to the shipper as described above with respect to the consignee. The carrier can require the driver to meet the shipper, in a method similar to the above described alternative delivery method, and the driver can then accept the item from the shipper in person. Additionally, in one embodiment, the driver may accept a package from a shipper while making deliveries to consignees, and the driver need not be near the mobile asset 140 in order to accept the item. In another embodiment, the mobile asset 140 includes a mechanism for automatically accepting items from shippers, such as a slot, a door, a window, a basket, or any other means for holding an item at least until the driver returns to the mobile asset 140.

In some embodiments, the consignor/consignee may access the carrier system 100 via a webpage or portal of a carrier, such as United Parcel Service of America, Inc. (UPS)) and be granted access to all mobile asset(s) 140 location data in a given area (e.g., within a zip code, city limits, neighborhood, etc.) The shipper/consignee could then select one of the mobile assets 140 and attempt to meet the mobile asset 140 at a schedule stop or arrange a dynamic delivery location for a possible package drop off/delivery. In other embodiments, the location data is of mobile stations 105 and/or item computing devices 160.

9. Further Alternative Delivery Options

In some embodiments, a consignee may be aware of an item being shipped to an associated address (e.g., purchase a product online, shipper notifies consignee) and may have identifying information for the item being shipped. For example, the consignee may have a unique item/shipment identifier associated with a product purchased online. As desired, the consignee may access the carrier system 100 via a webpage, portal, or social media associated with a carrier, such as United Parcel Service of America, Inc. (UPS) and through that access may track the location of the item. In some embodiments, the consignee may be granted temporary access to location information associated with the item (e.g., location of an associated mobile asset 140, mobile station 105 and/or item computing device 160). The webpage or portal may include a digital map with the location of the item overlayed thereon. In some embodiments, one or more scheduled stops (e.g., based on the dispatch plan) may also be indicated on the map as well.

In further embodiments, the consignee may request a dynamic delivery location and provide contact information for future notifications. In response to this request, the carrier system 100 may flag the associated record such that the item/consignee is considered for the identified dynamic delivery locations (e.g., see Block 530). If the established criteria are met for the consignee as described above for dynamic delivery, the consignee may receive a notification (see Block 540) and the delivery process may continue as describe with relation to FIGS. 5 and 6.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer implemented method for performing delivery of an item to a dynamic delivery location that is different from an original delivery location, wherein delivery of the item to the dynamic delivery location is based on a dynamically updateable dispatch plan and a real time or near real time updated location information for the item, the method comprising the steps of:

receiving, by a computing system comprising a processor and a network interface configured to communicate via at least one network, shipment data identifying a delivery address for each item of a plurality of items, the plurality of items including a first item;

electronically assigning the first item, by the computing system, to a mobile asset based at least in part on the dynamically updateable dispatch plan for the mobile asset, wherein the dynamically updateable dispatch plan identifies a predetermined delivery route with a plurality of service stop locations for the mobile asset to perform in a particular time frame, wherein the plurality of service stop locations includes a consignee's delivery address of the first item;

determining, by the computing system, executing a dynamic location module, a candidate dynamic delivery location for the first item by comparing the plurality of service stop locations of the dynamically updateable dispatch plan to a stop criteria, wherein the candidate dynamic delivery location is different from the consignee's delivery address for the first item;

determining, by the computing system, prior to the first item arriving at the candidate dynamic delivery location, a first consignee of the first item based on consignee selection criteria, the consignee selection criteria comprising (a) delivery preferences stored in a consignee profile of the first consignee and (b) at least one of (i) a distance between the candidate dynamic delivery location and one or more delivery addresses stored in the consignee profile of the first consignee that satisfy a distance threshold requirement or (ii) a time difference between a time of delivery at the candidate dynamic delivery location and a time of delivery at one of the one or more delivery addresses stored in the consignee profile of the first consignee that satisfy a time threshold requirement, wherein the time difference is determined based on the dynamically updateable dispatch plan;

subsequent to the determining of the first consignee, automatically decoding, by an electronic control module (ECM) device, near real-time data, the near real-time data including sensor data received from a location sensor and telematics data received from a telematics sensor coupled to the mobile asset, wherein the sensor data includes a geolocation of the mobile asset, and wherein the telematics data includes attributes of the mobile asset;

presenting the decoded near real-time data to a communication bus to transfer the decoded near real-time data to a data collection device;

causing a transmission, by the data collection device, of the decoded near real-time data to the computing system;

in response to receiving the decoded near-real time data, providing, by the computing system executing a tracking module and via the network interface, a notification comprising a hyperlink to a webpage providing near real time current location information for the mobile asset, wherein the near real time current location information is overlaid onto a digital map, wherein the digital map is displayable to the first consignee by a computing device associated with the first consignee, wherein the notification is provided to the computing device associated with the first consignee based at least in part on a triggering event, (a) while the mobile asset is en route providing a service according the dynamically updateable dispatch plan, (b) prior to the first item arriving at the candidate dynamic delivery location, and (c) in accordance with communication preferences stored in the consignee profile of the first consignee;

facilitating, by the computing system, verification of an identity of the first consignee upon successful delivery of the first item to the first consignee at the dynamic delivery location;

removing the consignee's delivery address of the first item from the predetermined delivery route; and automatically updating the dynamically updateable dispatch plan to provide an updated delivery route while the mobile asset is en route.

2. The method of claim 1, wherein the stop criteria comprises a threshold stop duration.

3. The method of claim 1, wherein the stop criteria comprises a predetermined number of stops preceding the consignee's delivery address of the first item based at least in part on a sequence of delivery provided in the dynamically updateable dispatch plan.

4. The method of claim 1, wherein the stop criteria comprises a predetermined number of stops after the consignee's delivery address of the first item based at least in part on a sequence of delivery provided in the dynamically updateable dispatch plan.

5. The method of claim 1, wherein the stop criteria includes a stop's visibility from public roadways, parking availability at the stop, or delivery frequency to the stop.

6. The method of claim 1, wherein the providing real time or near real time current location information comprises sending the notification to the computing device associated with the first consignee.

7. The method of claim 1, wherein the triggering event comprises a service stop preceding the candidate dynamic delivery location.

8. The method of claim 1, wherein the triggering event comprises a relative location of the first item that is within a predetermined distance from the candidate dynamic delivery location.

9. The method of claim 1, wherein the notification includes contact information for a driver associated with the mobile asset.

10. The method of claim 1, wherein the notification further identifies the candidate dynamic delivery location and an estimated time window from which the first consignee can retrieve the first item at the candidate dynamic delivery location.

11. The method of claim 1, wherein the notification further includes a verification code, and wherein verifying the identity of the first consignee comprises capturing the verification code.

12. The method of claim 11, wherein the verification code is captured from the computing device associated with the first consignee.

13. The method of claim 1, wherein the first consignee grants access to location information relating to the computing device associated with the first consignee to facilitate retrieval of the first item by the first consignee at the candidate dynamic delivery location.

14. An apparatus comprising at least one processor, at least one network interface configured to communicate via at least one network, and at least one memory including computer program code for facilitating delivery of an item at a dynamic delivery location based on a dynamically updateable dispatch plan and real time or near real time current location information for item, the at least one memory and the computer program code configured to, with the processor, cause the apparatus to at least:

receive shipment data identifying a delivery address for each item of a plurality of items, the plurality of items comprising a first item;

assign the first item to a mobile asset based at least in part on the dynamically updateable dispatch plan, wherein the dynamically updateable dispatch plan identifies a predetermined delivery route with a plurality of service stop locations for the mobile asset to perform in a particular time frame, wherein the plurality of service stop locations include a first delivery address of the first item;

determine a candidate dynamic delivery location by comparing the plurality of service stop locations of the dynamically updateable dispatch plan to a stop criteria wherein the candidate dynamic delivery location is different from the first delivery address for the first item;

determine a first consignee of the first item based on consignee selection criteria prior to the first item arriving at the candidate dynamic delivery location, the consignee selection criteria comprising (a) delivery preferences stored in a consignee profile associated with the first consignee corresponding to a computing system and (b) at least one of (i) a distance between the candidate dynamic delivery location and one or more delivery addresses stored in the consignee profile associated with the first consignee that satisfy a distance threshold requirement or (ii) a time difference between a time of delivery at the candidate dynamic delivery location and a time of delivery at one of the one or more delivery addresses stored in the consignee profile associated with the first consignee that satisfy a time threshold requirement, the time difference determined based on the dynamically updateable dispatch plan;

subsequent to the determining of the first consignee, cause a decoding, via an electronic control module (ECM) device, of near real-time data, the near real-time data including at least one of: sensor data received from a location sensor and telematics data received from a telematics sensor coupled to the mobile asset, wherein the sensor data includes a geolocation of the mobile asset, and wherein the telematics data includes attributes of the mobile asset;

cause a presenting of the decoded near real-time data to a communication bus to transfer the decoded real-time data to a data collection device for use by the apparatus;

in response to receiving the decoded near real-time data, provide a notification that indicates near real time current location information for the mobile asset, wherein the notification is provided to a computing device associated with the first consignee based at least in part on a triggering event, (a) while the mobile asset is en route providing a service according the dynamically updateable dispatch plan, (b) prior to the first item arriving at the candidate dynamic delivery location, and (c) in accordance with the consignee profile associated with the first consignee; and automatically update the dynamically updateable dispatch plan to provide an updated delivery route while the mobile asset is en route.

15. The apparatus of claim 14, wherein the stop criteria comprises a threshold stop duration.

16. The apparatus of claim 14, wherein the stop criteria comprises a predetermined number of stops preceding the first delivery address of the first item based at least in part on a sequence of delivery provided in the dynamically updateable dispatch plan.

17. The apparatus of claim 14, wherein the stop criteria comprises a predetermined number of stops after the first delivery address of the first item based at least in part on a sequence of delivery provided in the dynamically updateable dispatch plan.

18. The apparatus of claim 14, wherein the stop criteria includes visibility of a stop from public roadways, parking availability at the stop, or delivery frequency to the stop.

19. The apparatus of claim 14, wherein the triggering event comprises a service stop preceding the candidate dynamic delivery location.

20. The apparatus of claim 14, wherein the triggering event comprises a relative location of the first item that is within a predetermined distance from the candidate dynamic delivery location.

21. The apparatus of claim 14, wherein the notification includes contact information for a driver associated with the mobile asset.

22. The apparatus of claim 14, wherein the at least one memory and the computer program code are further configured to, with the processor, cause the apparatus to at least send the notification to the first consignee, the notification identifying the candidate dynamic delivery location and an estimated time window from which the first consignee can retrieve the first item at the candidate dynamic delivery location.

23. The apparatus of claim 14, wherein the notification includes a verification code, and wherein verifying the identity of the first consignee comprises capturing the verification code.

24. The apparatus of claim 23, wherein the verification code is captured from the computing device associated with the first consignee.

25. The apparatus of claim 14, wherein the first consignee grants access to location information relating to the computing device associated with the first consignee to facilitate retrieval of the first item by the first consignee at the candidate dynamic delivery location.

\* \* \* \* \*